(No Model.)　　　M. DAINARD.　　2 Sheets—Sheet 1.

MACHINE TABLE.

No. 284,391.　　　　　　Patented Sept. 4, 1883.

WITNESSES:
Chas. T. Howell,
C. Sedgwick

INVENTOR:
M. Dainard,
BY Munn & Co.
ATTORNEYS.

(No Model.) 2 Sheets—Sheet 2.

M. DAINARD.
MACHINE TABLE.

No. 284,391. Patented Sept. 4, 1883.

WITNESSES:
Chas. T. Howell
C. Sedgwick

INVENTOR:
M. Dainard
BY Munn & Co
ATTORNEYS.

UNITED STATES PATENT OFFICE.

MILTON DAINARD, OF WEST EXETER, NEW YORK.

MACHINE-TABLE.

SPECIFICATION forming part of Letters Patent No. 284,391, dated September 4, 1883.

Application filed January 5, 1883. (No model.)

*To all whom it may concern:*

Be it known that I, MILTON DAINARD, of West Exeter, in the county of Otsego and State of New York, have invented a new and Improved Combined Sawing, Grooving, and Boring Machine, of which the following is a full, clear, and exact description.

My invention consists of the arbor of a sawing-machine contrived for and provided with means whereby the saw may be removed and a boring-tool may be attached and be rotated and shifted lengthwise for boring holes, together with a contrivance of the table for being readily converted either into a sawing-machine table or a boring-machine table; and the arbor is also adapted for the application of a grooving-tool in the place of the saw when required, all as hereinafter more fully described.

Reference is to be had to the accompanying drawings, forming part of this specification, in which similar letters of reference indicate corresponding parts in all the figures.

Figure 1:
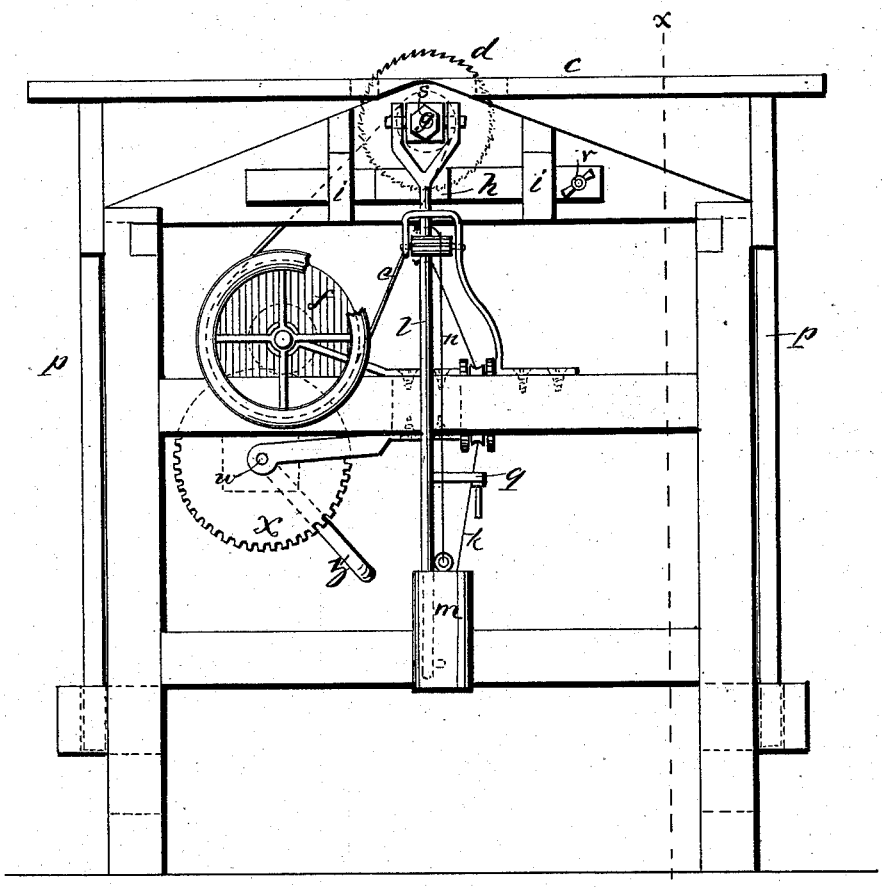
Figure 2:
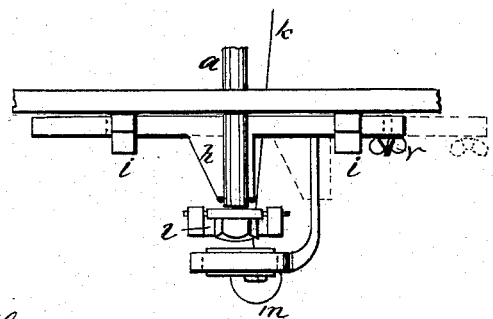
Figure 3:
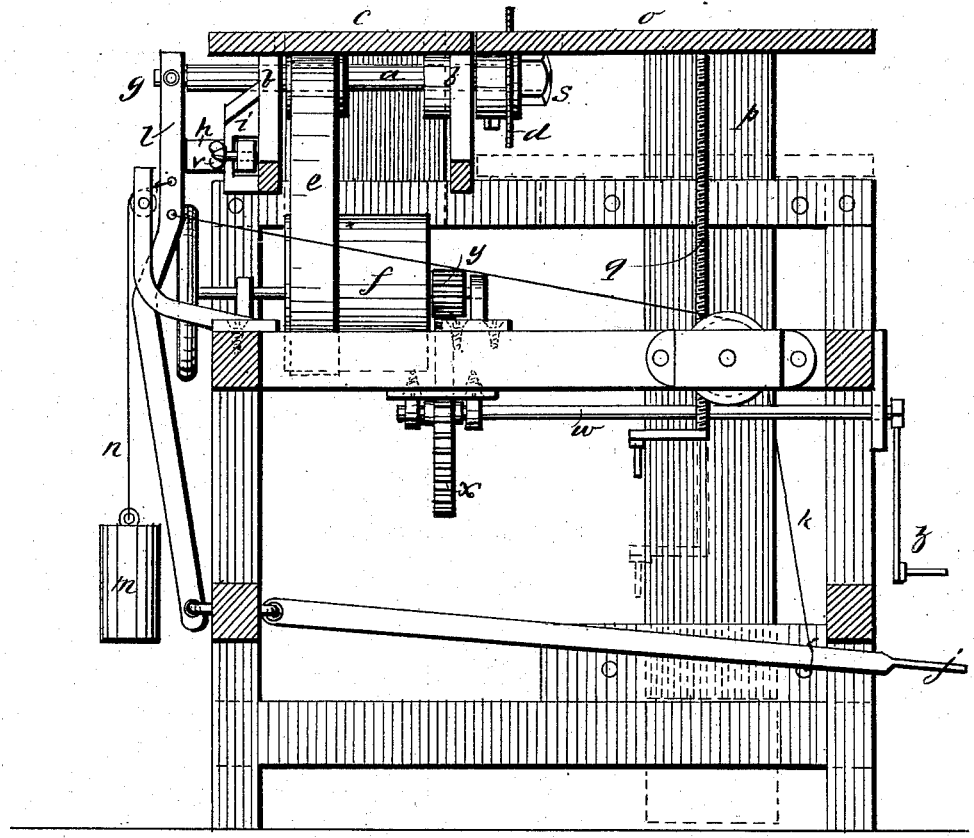
Figure 4:
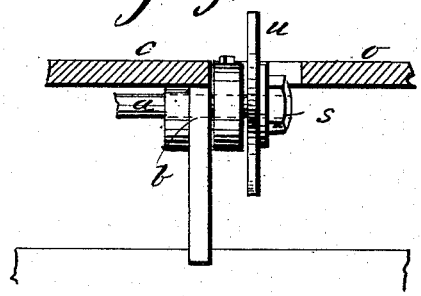
Figure 5:
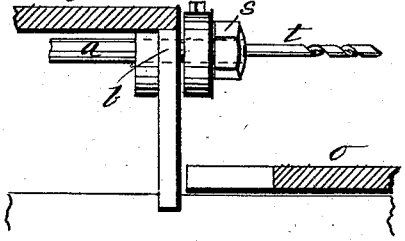

Figure 1 is a side elevation of my improved combined sawing, grooving, and boring machine. Fig. 2 is a detail of the same in plan view. Fig. 3 is a sectional elevation of Fig. 1 on the line $x\ x$. Fig. 4 is a detail showing the application of the groover to the mandrel, and Fig. 5 is a detail showing the boring-tool attached to the mandrel.

The mandrel $a$ is mounted in suitable bearings, $b$, under the table $c$, for carrying the saw $d$, as in ordinary sawing-machines, the power being applied by the belt $e$ from the drum $f$, along which the belt may shift when desired. The end $g$ of the mandrel is connected with the shifting-lever $l$, and the sliding block $h$ is arranged in relation to said shifting-lever and fitted in suitable boxes, $i$, to be shifted in front of the lever and be fastened in that position by a set-screw, $v$, when the machine is to be used for sawing or grooving, to prevent the arbor from being shifted by the lever; but when the machine is to be used for boring, the block is shifted back to allow said lever to be worked for shifting the mandrel by the foot-lever $j$ and cord $k$, suitably connected to it. The weight $m$, suspended from the lever $l$ by the cord $n$, pulls the arbor back.

When the machine is to be used for boring, the part $o$ of the table is shifted down to the position represented by dotted lines in Fig. 3 by the screw $q$, the said part of the table being mounted on the vertically-sliding supports $p$ for the purpose.

The nut $s$, used to fasten the saw $d$ and the grooving-tool $u$, is constructed with a hole through it to enable the boring-tool $t$ to be applied, and the arbor has the usual socket for the boring-tools.

Power is to be applied to the drum $f$ from a driving-shaft, $w$, by a wheel, $x$, and pinion $y$, said shaft to be operated by a hand-crank, $z$, or by power applied in any approved way.

The groover $u$ is to be applied in the same manner that the saw is, and is to be worked the same.

It will be seen that the machine may be readily converted from one condition to another, and will work as efficiently for the different purposes as machines specially constructed therefor.

Having thus fully described my invention, I claim as new and desire to secure by Letters Patent—

The vertically-shifting portion $o$ of a sawing-machine table, shifting supports $p$, and adjusting-screw $q$, in combination with the arbor $a$, adapted for the application of a boring-tool and for being shifted lengthwise in its bearings, substantially as described.

MILTON DAINARD.

Witnesses:
JAMES COUPE,
JOHN W. BOYLE.